(12) United States Patent
Lim et al.

(10) Patent No.: US 10,530,367 B2
(45) Date of Patent: Jan. 7, 2020

(54) CLOCK SYNCHRONIZATION IN MULTI-DIE FIELD PROGRAMMABLE GATE ARRAY DEVICES

(71) Applicant: Intel Corporation, Santa Clara, CA (US)

(72) Inventors: Chooi Pei Lim, Bayan Baru (MY); Teik Wah Lim, Bayan Lepas (MY); Boon Haw Ooi, Bayan Lepas (MY); Keong Hong Oh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,956

(22) Filed: Dec. 28, 2018

(65) Prior Publication Data

US 2019/0140647 A1    May 9, 2019

(51) Int. Cl.
*H03K 19/177*    (2006.01)
*G06F 17/50*    (2006.01)

(52) U.S. Cl.
CPC ..... *H03K 19/1776* (2013.01); *G06F 17/5054* (2013.01); *H03K 19/17704* (2013.01); *H03K 19/17708* (2013.01); *H03K 19/17724* (2013.01); *H03K 19/17736* (2013.01); *H03K 19/17744* (2013.01)

(58) Field of Classification Search
CPC . H01L 2224/73204; H01L 2924/15311; H01L 24/16; H01L 2225/06513; H01L 23/481; H01L 23/5386; H01L 24/81; H01L 2225/06517; H01L 2224/16227; H01L 2224/92125; H01L 2224/1703; H01L 2224/16137; H01L 2224/16235; H01L 2224/81; H01L 27/0688; G06F 1/12; G06F 17/5054; G06F 2217/62; G06F 1/10; G06F 13/1689; G06F 17/505; G06F 2217/84; H03K 19/017581; H03K 19/17736; H03K 19/177; H03K 19/1774; H03K 19/17744; H03K 19/17764; G01R 31/31727; G01R 31/318513; G01R 31/31725; G01R 31/31922; G01R 31/31937; G11C 11/4076; G11C 7/222; G11C 11/4096; G11C 29/022; G11C 29/50012; G11C 7/225; Y02D 10/14; Y02D 10/151
See application file for complete search history.

(56) References Cited

U.S. PATENT DOCUMENTS

| | | | | |
|---|---|---|---|---|
| 7,095,253 B1 * | 8/2006 | Young | ............... | H01L 23/5382 257/E21.705 |
| 7,209,396 B2 * | 4/2007 | Schnell | ............... | G11C 7/22 365/191 |
| 7,706,151 B2 * | 4/2010 | Neidorff | ............... | H02M 1/4216 363/9 |
| 7,949,907 B2 * | 5/2011 | Kodavalla | ............... | H03K 19/17744 714/700 |

(Continued)

*Primary Examiner* — Vibol Tan
(74) *Attorney, Agent, or Firm* — Fletcher Yoder, P.C.

(57) ABSTRACT

The disclosure relates to systems and methods for sector-to-sector and die-to-die clock synchronization in programmable logic devices. The methods and systems may employ phase difference detector and programmable delay elements to minimize skews in the clock tree and facilitate timing closure of time-critical paths and increase in operating frequencies.

22 Claims, 11 Drawing Sheets

(56) References Cited

U.S. PATENT DOCUMENTS

| | | | | |
|---|---|---|---|---|
| 8,546,955 B1* | 10/2013 | Wu | ............... | H01L 23/5384 |
| | | | | 257/686 |
| 8,981,813 B2* | 3/2015 | Chan | ............ | H03K 19/017581 |
| | | | | 326/39 |
| 9,331,845 B2* | 5/2016 | Yang | ............... | H03L 7/0814 |
| 9,413,364 B2* | 8/2016 | Li | ............... | H03L 7/091 |
| 9,568,536 B2* | 2/2017 | Kumar Goel | ...... | G01R 31/2601 |
| 9,602,106 B1* | 3/2017 | Bourgeault | ........ | H03K 19/1733 |
| 9,666,539 B1* | 5/2017 | Li | ............... | H01L 23/562 |
| 9,735,084 B2* | 8/2017 | Katkar | ............... | H01L 23/36 |
| 10,063,241 B2* | 8/2018 | Ma | ............... | G11C 7/222 |
| 2019/0044520 A1* | 2/2019 | Tang | ............... | H03L 7/07 |
| 2019/0140649 A1* | 5/2019 | Tang | ............... | H03K 19/17704 |

\* cited by examiner

US 10,530,367 B2

CLOCK SYNCHRONIZATION IN MULTI-DIE FIELD PROGRAMMABLE GATE ARRAY DEVICES

BACKGROUND

This disclosure relates to time synchronization systems and methods for multi-die integrated circuit devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Programmable logic devices are a class of integrated circuits that can be programmed to perform a wide variety of operations. A programmable logic device may include programmable logic elements programmed that may be programmed to perform custom operations or to implement a circuit design. To program custom operations and/or circuit design into a programmable logic device, the circuit design may be compiled into a bitstream and programmed into configuration memory in the programmable logic device. The values programmed using the bitstream define the operation of programmable logic elements of the programmable logic device. Certain functions programmed in a programmable logic device may be synchronous. For example, different regions of the programmable logic device may operate in lock step, using a clock signal to trigger operations. The synchronization between parts of a programmable logic device circuits may be located in different areas of the programmable logic device die may be obtained by a clock distribution network, or clock tree. As electronic systems employ programmable logic devices in more complex architectures, such as in multi-die devices, design of programmable circuitry that supports the clock trees may be more challenging.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
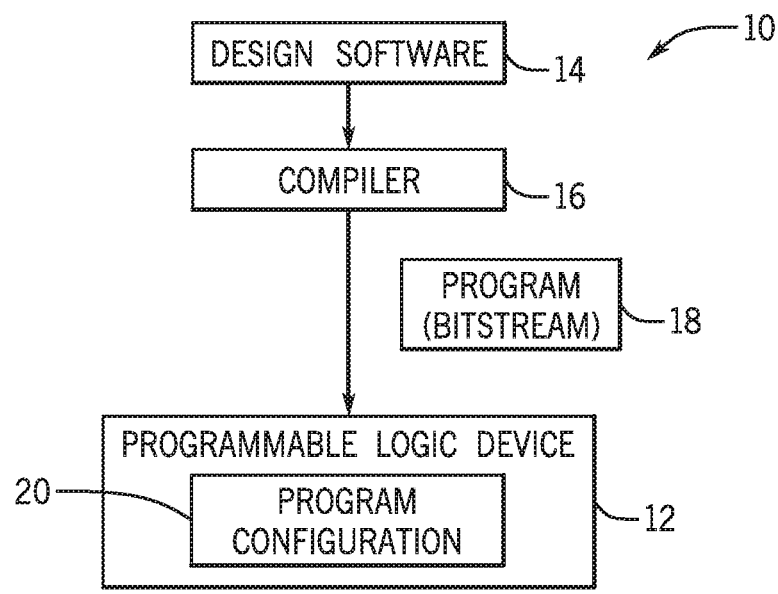
FIG. 1 is a block diagram of a programmable logic device that is programmed with a circuit design, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The highly flexible nature of programmable logic devices makes them an excellent fit for accelerating many computing tasks. Thus, programmable logic devices are increasingly used as accelerators for machine learning, video processing, voice recognition, image recognition, and many other highly specialized tasks, particularly those that would be too slow or inefficient in software running on a processor. The increase in the size and complexity of systems that may employ programmable logic devices may lead to an increase in the demand for programmable fabric resources. In order to provide larger devices, and in view of potential production yield constraints, certain programmable logic devices may be formed from multiple programmable logic dies connected via bridge circuitry (e.g., multi-die programmable logic devices, multi-die field programmable gate arrays (FPGAs) devices).

To implement circuit designs in programmable logic fabric, different sectors, portions, or regions of a programmable logic device may perform different operations on data that may be exchanged between the regions. In order to process and exchange data, it may be useful to have synchronization in the timing of the operations taking place in the multiple sectors (e.g., regions). To that end, clock networks or clock trees may be used. In general, clock trees may be used to provide a synchronized clock signal to various circuit elements (e.g., registers, memory elements) from a common clock source. In large programmable fabric devices and/or in multi-die programmable fabric devices, the long distances in a data path and/or the presence, in the data path, of the bridge circuitry connecting multiple programmable logic dies may lead to undesired clock skews. Moreover, in some situations, the latency may be indeterminate, which may result in unpredictable clock skew between different regions of the programmable logic device.

Embodiments described herein are related to programmable logic devices, electronic systems include programmable logic devices, and methods of operation thereof that may provide reduced clock skew between different regions (e.g., sectors, dies) of a programmable logic device or a field programmable gate array. In some embodiments, timing synchronization circuitry may be placed in the interface between the programmable fabric and the bridge circuitry. In some embodiments, timing synchronization circuitry may be placed in sector interfaces or boundaries within a die. Timing synchronization circuitry may include, among other things, switching circuitry, delay elements, and/or phase difference detectors. The use of the timing circuitry described herein may allow for synchronization (e.g., skew minimization, phase alignment) between the different regions of the programmable logic device.

As discussed herein clock skew may be a phase difference in a clock signal received in two different regions of a circuit. As an illustrative example, a clock signal with be transmitted through a line that may have a latency that is a non-integer factor of the period of that clock signal. For example, a clock with period T and frequency f=1/T may be transmitted over a clock tree that may provide a latency of 100.3 T between two regions, which may result in a phase difference of 0.3 T between them. To synchronize (e.g., skew) the two regions latency may be added. In the above example, a delay of 0.7 T or a 1.7 T may be added to compensate the delays. The resulting compensation of the delays between sectors and between dies in the timing circuitry may, thus, allow seamless multi-die integration and timing closure, and may increase the maximum frequency of operation (e.g., Fmax) for circuits implemented in programmable logic dies.

By way of introduction, FIG. 1 illustrates a block diagram of a system 10 that may employ a programmable logic device 12 that may implement data processing functions in multiple regions of the programmable devices and that may be synchronized using a clocking signal, in accordance with embodiments presented herein. Using the system 10, a designer may implement a circuit design functionality on an integrated circuit, such as the reconfigurable programmable logic device 12, (e.g., an FPGA).

The designer may implement a circuit design to be programmed onto the programmable logic device 12 using design software 14, such as a version of Intel® Quartus® by Intel Corporation of Santa Clara, Calif. The design software 14 may use a compiler 16 to generate a low-level circuit-design defined by bitstream 18, sometimes known as a program object file and/or configuration program, which programs the programmable logic device 12. In the process of compiling the bitstream 18, the design software may assign certain regions of the programmable logic device 12 to perform certain functions. To synchronize the different regions, the design software 14 may include in the bitstream 18, programming instructions for a clock tree, as detailed below. Moreover, in the process of production of the bitstream 18, the design software 14 may also calculate timing constraints (e.g., timing margins, data transference margins) of the circuit design, and operating frequencies (e.g., Fmax) for operation of the circuit design in the programmable logic device 12. Instructions to perform synchronization may also be included in the bitstream 18.

The compiler 16 may, thus, provide machine-readable instructions representative of the circuit design to the programmable logic device 12 in the form of one or more bitstreams 18. The configuration program (e.g., bitstream) 18 may be programmed into the programmable logic device 12 as a configuration program 20. The configuration program 20 may, in some cases, represent an accelerator function to perform for machine learning, video processing, voice recognition, image recognition, or other highly specialized task. As discussed above, the configuration program may be distributed across multiple sectors or dies in the programmable logic device 12 and may include sector-to-sector and/or bridge data transfers.

During the design process, the design software 14 may provide tools to test and/or verify timing conditions. Examples of situations that may be tested include racing conditions, register-to-register timing margins, critical timing in data paths, and/or timing closure. To that end, the design software may employ a model of the clocking resources available in the physical die. As discussed herein, some of the clocking resources may include timing circuitry disposed between sectors of a die and/or between dies of the programmable logic device 12, which may reduce timing skews and facilitate timing closure.

Figure 2:
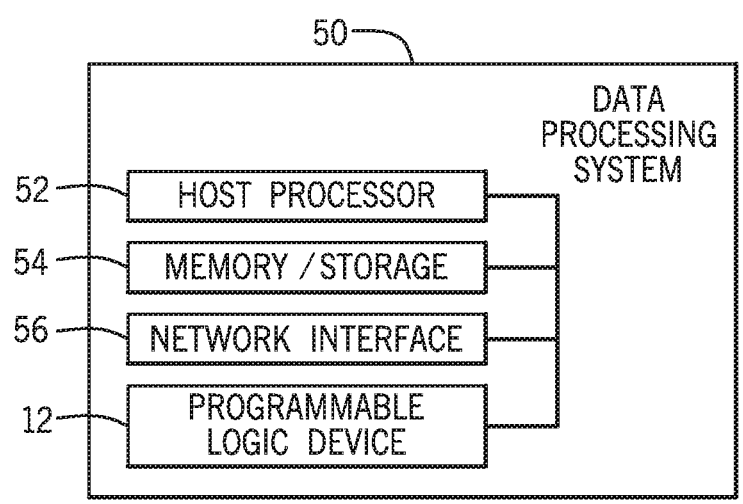
FIG. 2 is a block diagram of a data processing system that may use the programmable logic device to provide fast data processing capabilities, in accordance with an embodiment.

The programmable logic device 12 may be, or may be a component of, a data processing system 50, as shown in FIG. 2. The data processing system 50 may include a host processor 52, memory, storage circuitry 54, and a network interface 56. The data processing system 50 may include more or fewer components (e.g., electronic display, user interface structures, application specific integrated circuits (ASICs)). The host processor 52 may include any suitable processor, such as an Intel® Xeon® processor or a reduced-instruction processor (e.g., a reduced instruction set computer (RISC), an Advanced RISC Machine (ARM) processor) that may manage a data processing request for the data processing system 50 (e.g., to perform machine learning, video processing, voice recognition, image recognition, data compression, database search ranking, bioinformatics, network security pattern identification, spatial navigation, or the like).

The memory and/or storage circuitry 54 may include random access memory (RAM), read-only memory (ROM), one or more hard drives, flash memory, or the like. The memory and/or storage circuitry 54 may be considered external memory to the programmable logic device 12 and may hold data to be processed by the data processing system 50 In some cases, the memory and/or storage circuitry 54 may also store configuration programs (bitstreams 18) for programming the programmable logic device 12. The network interface 56 may allow the data processing system 50 to communicate with other electronic devices. The data processing system 50 may include several different packages or may be contained within a single package on a single package substrate.

In one example, the data processing system 50 may be part of a data center that processes a variety of different requests. For instance, the data processing system 50 may receive a data processing request via the network interface 56 to perform machine learning, video processing, voice recognition, image recognition, data compression, database search ranking, bioinformatics, network security pattern identification, spatial navigation, or some other specialized task. The host processor 52 may cause the programmable logic fabric of the programmable logic device 12 to be programmed with a particular accelerator related to requested task. For instance, the host processor 52 may cause the configuration data (e.g., bitstream 18) to be stored on the storage circuitry 54 or cached in a memory of the programmable logic device 12 to be, later, programmed into the programmable logic fabric of the programmable logic device 12. The configuration data (e.g., bitstream 18) may represent a circuit design for a particular accelerator function relevant to the requested task. Indeed, in one example, an accelerator may assist with a voice recognition task less than a few milliseconds (e.g., on the order of microseconds) by rapidly accessing and processing large amounts of data in the accelerator.

Figure 3:
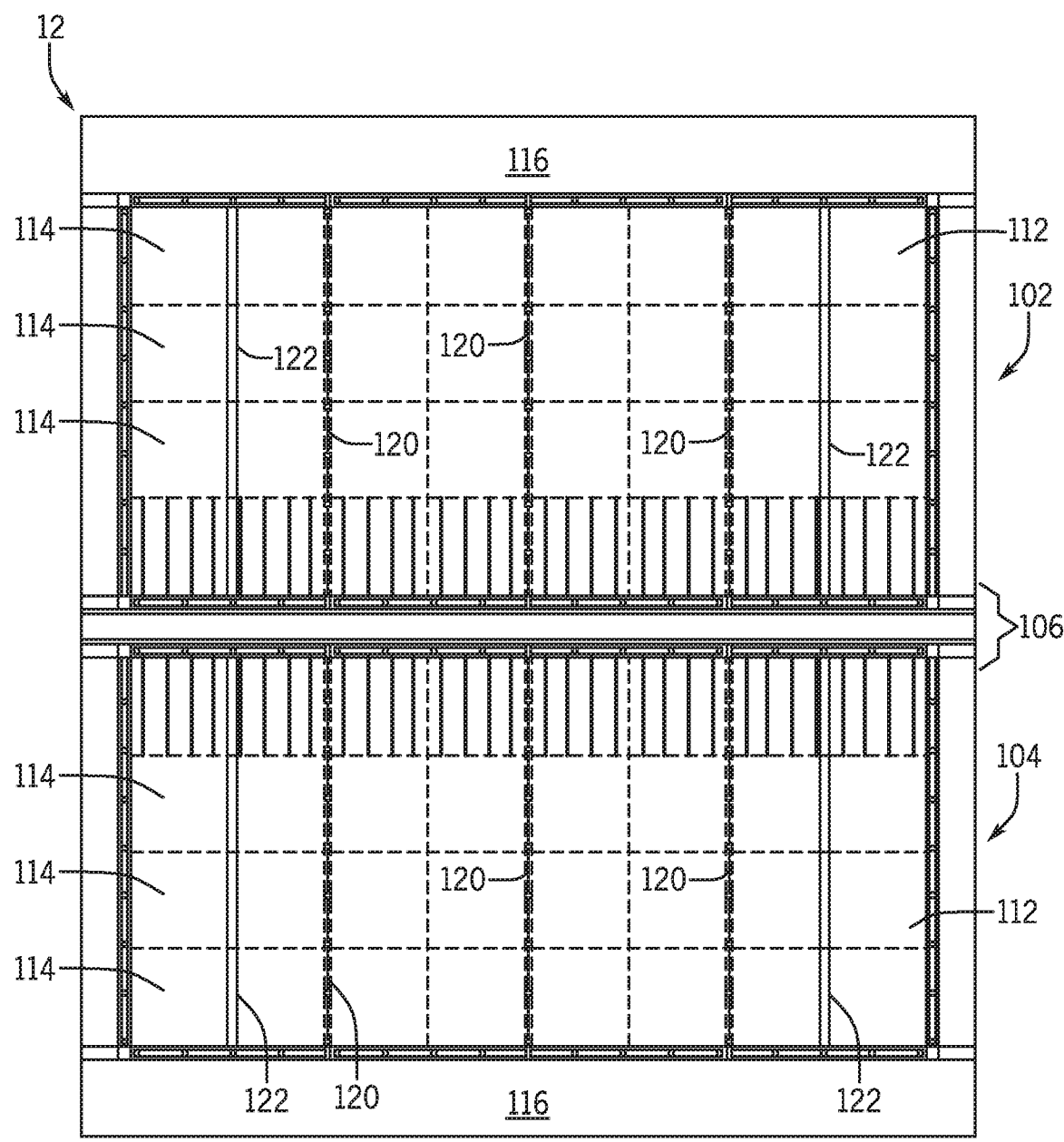
FIG. 3 is a diagram of a multi-die programmable logic device that may employ timing circuitry to performing synchronization, in accordance with an embodiment.

FIG. 3 illustrates a multi-die programmable logic device 12. The multi-die programmable logic device 12 may include a first programmable logic die 102 and a second programmable logic die 104. The programmable logic dies 102 and 104 may be coupled through a bridge 106. Bridge 106 may be, for example, a wire bonded interface (e.g., a row of contacts or pins) or a 2.5D interface (e.g., a high-density interconnects bridge). In some embodiments, the coupling between the programmable logic dies 102 and 104 and the bridge 106 may employ a microbump interconnect. As detailed below, the interface between the programmable logic dies 102 and 104 and the bridge 106 may include a timing strip (e.g., timing circuitry) along the edge of the dies.

The programmable logic dies 102 and 104 may include programmable fabric 112. In some embodiments, the programmable fabric 112 may be arranged in an array of sectors 114. Each sector 114 may include a sector controller, a sector-specific configuration memory and store configuration data associated with that sector. The sectors may include sector-level timing circuitry, which may include phase difference detectors and delay elements, as detailed below. The first programmable logic die 102 and/or the second programmable logic die 104 may, each, be include input/output (I/O) circuitry 116. The I/O circuitry 116 may include, among other things, protocol circuitry, transceivers, amplifiers, clock-and-data recovery circuitry, and eye detectors. The I/O circuitry 116 may be configured to access a memory device (e.g., a high bandwidth memory (HBM), dynamic random-access memory (RAM) device), or to connect to other electronic devices using a communications protocol, such as an Ethernet protocol, a peripheral component interconnect express (PCIe) protocol, or a universal serial bus (USB) protocol. The programmable fabric 112 may also include a Network on Chip (NoC) 120 and/or hardened interconnect lines 122 that may provide low latency access between sectors 114 and the I/O circuitry 116 or the bridge 106.

Figure 4:
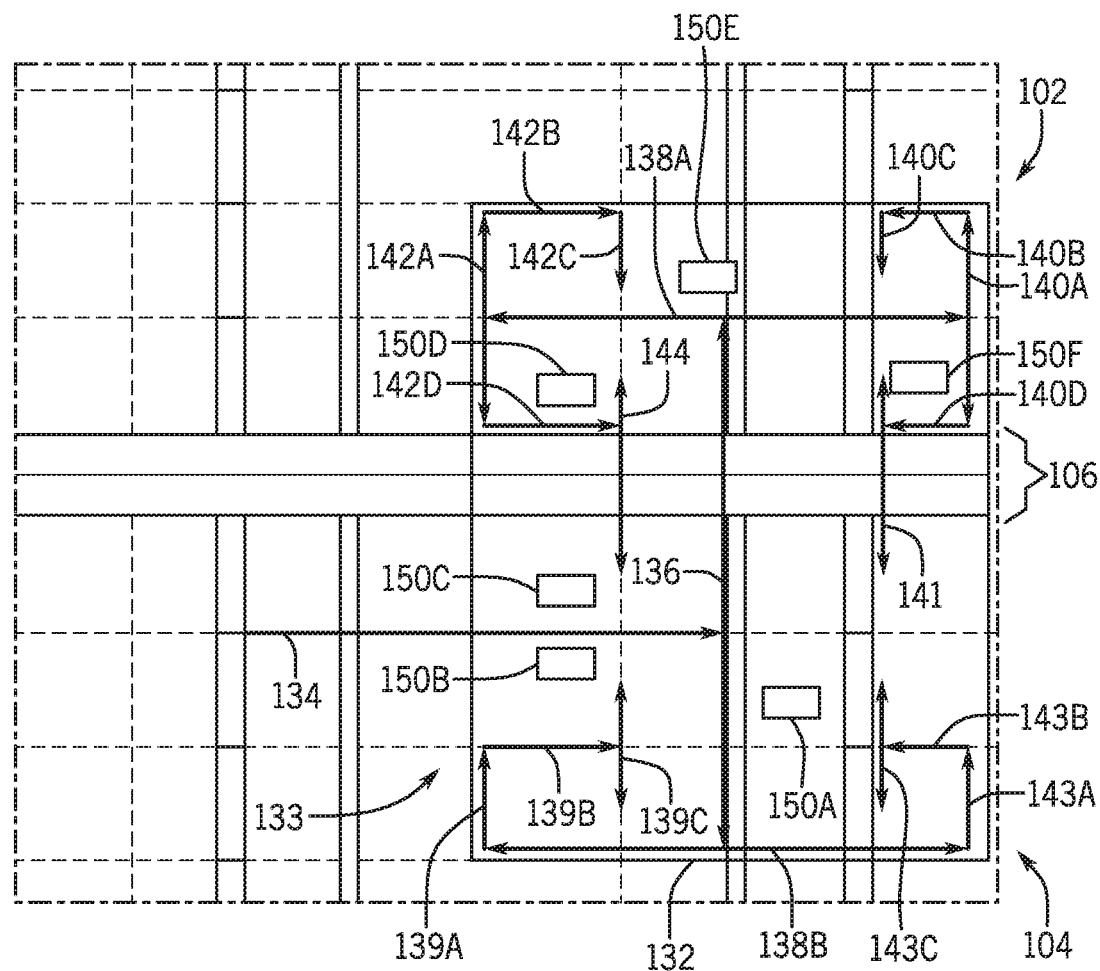
FIG. 4 is a schematic illustration of a circuit design with a minimized skew, implemented in a multi-die programmable logic device, in accordance with an embodiment.

FIG. 4 provides an example of a circuit design 132 implemented in a multi-die device. In FIG. 4, programmable logic dies 102 and 104 may be connected via the bridge 106. The circuit design 132 may include a clock tree 133. Clock tree 133 may include the clock tree branches 134, 136, 138A, 138B, 139A, 139B, 139C, 140A, 140B, 140C, 140D, 141, 142A, 142B, 142C, 142D, 143A, 143B, 143C, and 144. The clock tree 133 may provide a clock signal to registers 150A, 150B, 150C, located in programmable logic die 104, and registers 150D, 150E, and 150F, located in programmable logic die 102. Note that the clock tree 133 spans multiple sectors and multiple dies. Therefore, it may include die-crossing clock tree branches 136, 141, and 144, and sector-crossing tree branches 138A, 138B. The die clock tree branches may go through timing circuitry at the edge between the programmable logic dies 102 and 104 and the bridge 106, and the sector-crossing tree branches may be controlled by timing circuitry located in the boundary of sectors, as discussed above.

The timing circuitries may facilitate balancing of the clock tree 133 and allows reduction in the clock skews between registers 150A, 150B, 150C, 150D, 150E, and 150F, resulting in easier timing closure and potentially higher operating frequency Fmax for the circuit design 132. For example, to reduce clock skew between clock signals in the first programmable logic die 102 and clock signals in the second programmable logic die 104, timing circuitry along the edge of the programmable logic dies 102 and 104 that may interface the bridge 106 may incorporate delays to clock signals in the clock tree branches 136, 141, and 144, that cross the bridge 106. The delays may be determined by identifying clock skews and adding delays that minimize the clock skew. As another example of clock skew minimization, two neighboring sectors 114 may provide clock signals to a phase difference detector circuitry in the boundary of the two sectors 114 to identify if delays may be added to reduce clock skew between sectors 114.

Figure 5:
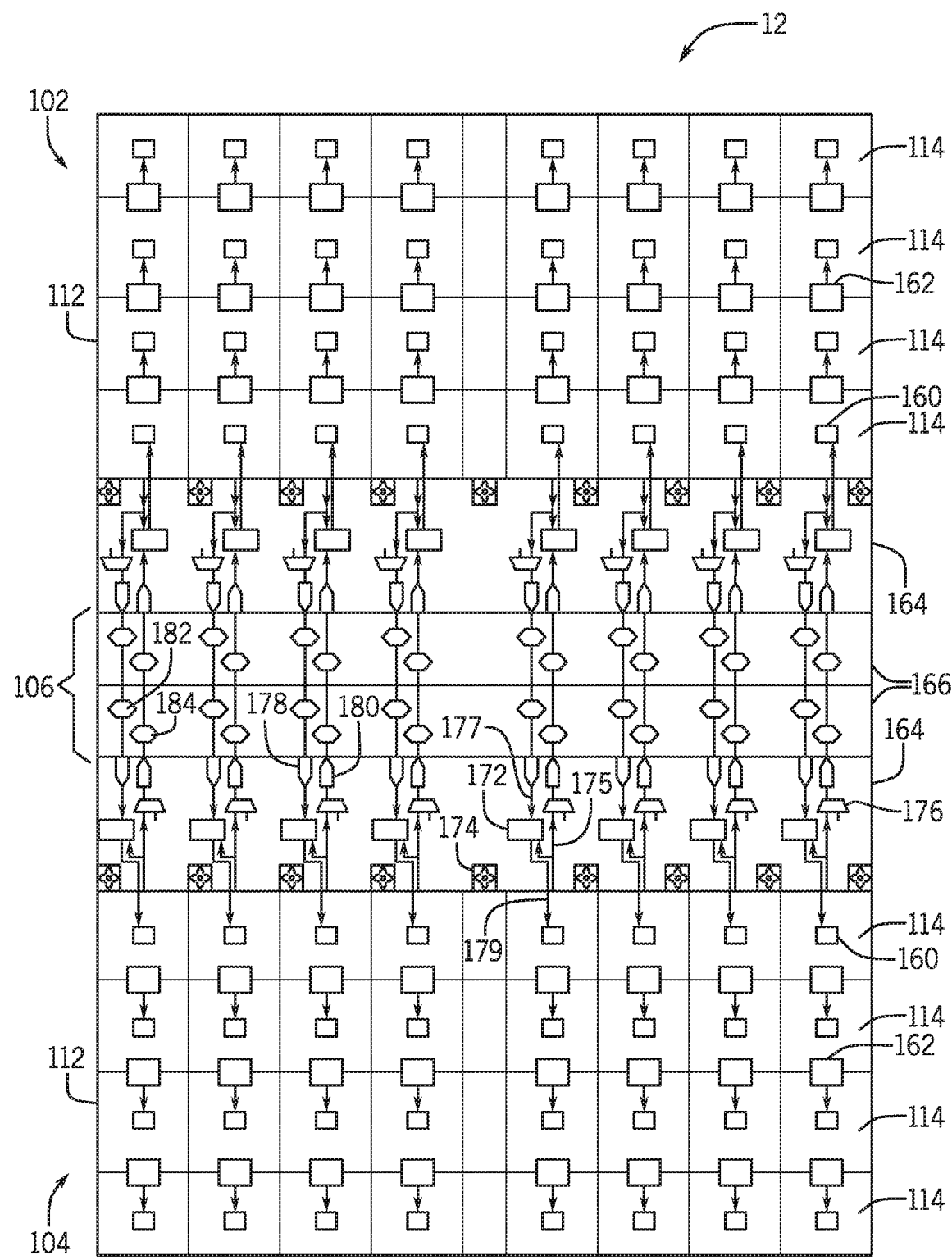
FIG. 5 is a schematic diagram of the programmable logic device and the timing circuitry that may be used by a multi-die programmable logic device to perform synchronizations, in accordance with an embodiment.

FIG. 5 illustrates an example of a multi die programmable logic device 12. In FIG. 5, programmable logic dies 102 and 104 may be connected via the bridge 106. Each of the programmable logic dies 102 and 104 may have multiple sectors 114 in the programmable fabric 112. Programmable fabric 112 may include sector delay elements 160 and phase difference detectors 162. The phase difference detector 162 that may be logically or physically disposed in a sector boundary between sectors and may be referred herein as a sector boundary phase difference detector. As discussed above sector delay elements 160 and phase different detectors 162 may be used to provide timing synchronization between sectors 114. As illustrated in FIG. 5, each of the programmable logic dies 102 and 104 may also include a timing strip 164 (e.g., timing circuitry). The timing strip 164 may be used to facilitate diamond synchronization between programmable fabrics 112 of the programmable logic dies 102 and 104. To that end, each timing strip 164 may be coupled to interconnect circuitry 166 of the bridge 106 and may compensate the latency of clock signals as it crosses from the interconnect circuitry 166 to the programmable fabric 112.

To perform the skew compensation, the timing strip 164 may include phase detector and delay circuitry 172. The phase detector and delay circuitry 172 may be coupled to clock distribution elements 174 of that distribute clock signals to the programmable fabric 112 of the programmable logic dies 102 and 104. For example, the phase detector and delay circuitry 172 may receive a clock 175 from the programmable fabric 112 and compare its phase with the clock 177 that may come from the bridge 106 via a connection 178. The phase detector and delay circuitry 172 may compare the phase differences and incorporate delays in the clock signal 179 that may be provided to the programmable fabric 112. The delays may compensate for the skews detected. It should be understood that the above-described adjustments may feedback from the clock signal 179 to the clock 175. As such, adjustments may be performed iteratively. The clock 175, which after the above-described adjustments may be in phase with received clock 177, may be transmitted through the bridge 106 via the connection 180. In some embodiments, a clock selection multiplexer 176 may be used to allow configuration of the clock source in the timing strip 164. As illustrated, bridge 106 may have the interconnect circuitry 166 connected via connections 182 and 184.

Figure 6:
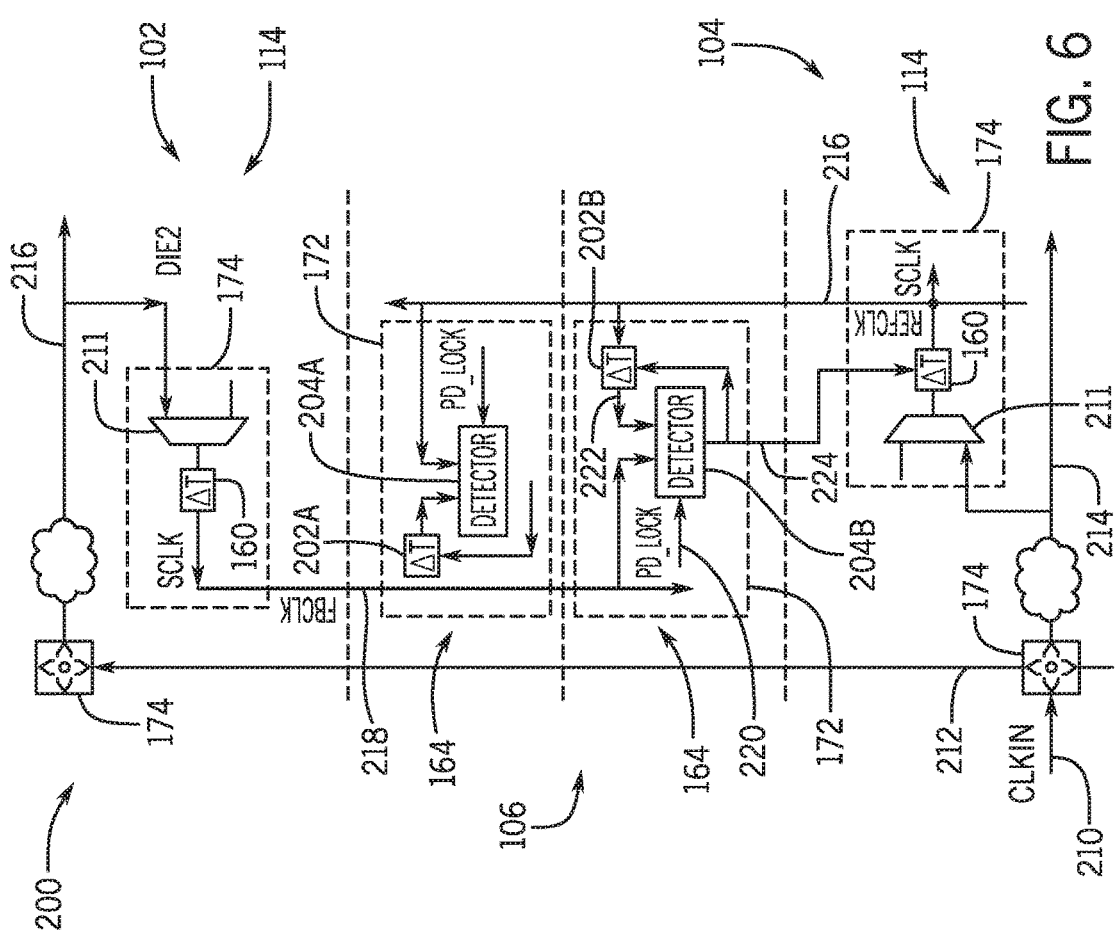
FIG. 6 is a schematic diagram of die-to-die synchronization, in accordance with an embodiment.

FIG. 6 includes a diagram 200 illustrating the feedback-based synchronization process between programmable logic dies 102 and 104 across the bridge 106 using the phase detector and delay circuitry 172. Each phase detector and delay circuitry 172 may include a delay element (e.g., delay elements 202A and 202B) and a phase difference detector (e.g., phase difference detectors 204A and 204B). The clock tree illustrated in FIG. 6 may include a clock input 210 in programmable logic die 104. Clock input 210 may be routed by a clock distribution element 174 to the programmable logic die 102 via the clock branch 212 and to a clock distribution element 174 of a sector 114 of the programmable logic die 104 via clock branch 214. In its turn, the clock distribution element 174 in the programmable logic die 102 may connect the clock branch 212 to a clock branch 216 through a clock distribution element 174, to provide clocking to a sector 114. In the illustrated system, each clock distribution element 174 of each sector has a sector delay element 160 and a clock selector multiplexer 211.

In the diagram of FIG. 6, the phase detector and delay circuitry 172 of the programmable logic die 104 is illustrated as adjusting the delay. To that end, the phase difference detector 204B may receive a clock signal 216 from the programmable logic die 104 (e.g., a reference clock) and a feedback clock 218 from the programmable logic die 102. The feedback clock 218 may be subject to the latencies of the bridge 106. The phase difference detector 204B may also receive a phase lock signal 220, which may be used to trigger the operation of the phase difference detector 204B. The clock signal 216 may be delayed in delay element 202B to generate a clock signal 222 which may be compared with the feedback clock 218. If the phase difference is larger than a tolerance (e.g., 1 ns, 10 ns, or 100 ns), the delay element 202B and/or the sector delay element 160 of sector 114 (e.g., a sector adjacent to the timing strip 164) may be adjusted (e.g., increase in the delay, decrease in the delay) by a control signal 224. The delay element 202B and the sector delay 160 may have the same absolute delay, and the control signal 224 may adjust both delay elements 160 and 202B simultaneously. As a result, the delay element 202B may compensate the delay of the feedback clock 218 while sector delay elements 160 may compensate the delay of the clock distribution branch 212. The adjustments in the delay element 202B may be incremental and/or discrete. In this manner, the phase detector and delay circuitry 172 may minimize the skew between the clock signals distributed at the end of clock branches 214 and 216.

Figure 7:
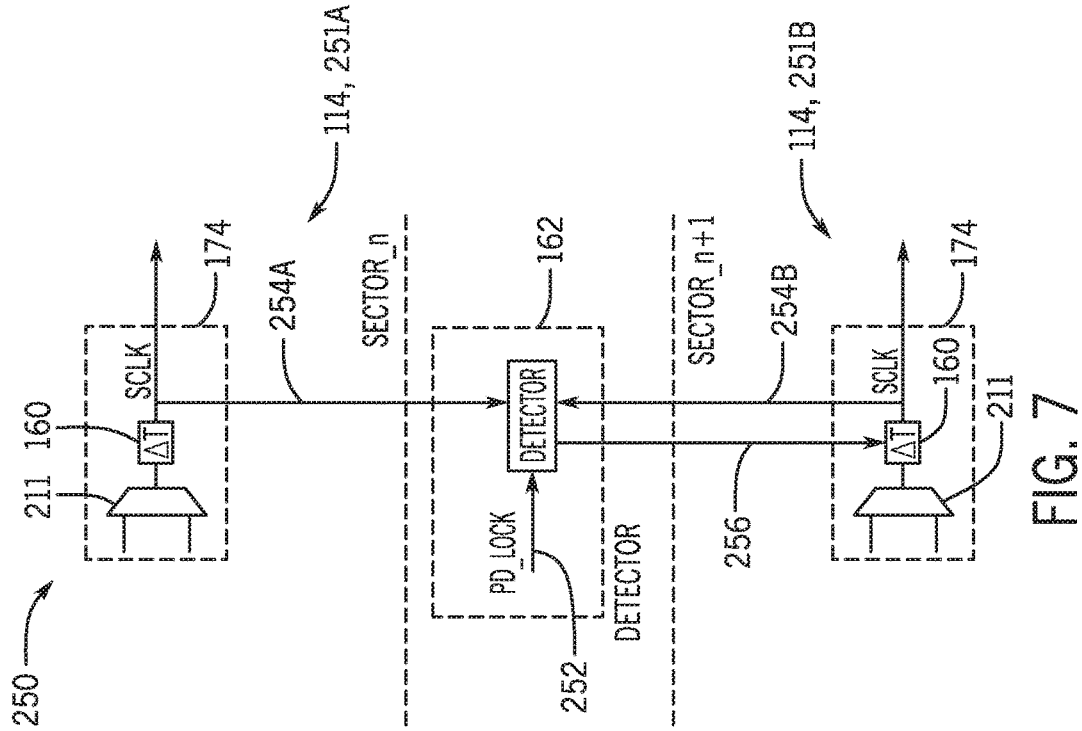
FIG. 7 is a schematic diagram of a sector-to-sector synchronization, in accordance with an embodiment.

FIG. 7 includes a diagram 250 illustrating the feedback-based synchronization between two neighboring sectors 114, sector 251A, and sector 251B. As discussed above, each sector may include a clock distribution element 174, which may include a sector delay element 160 and a clock selector multiplexer 211. Clock distribution element 174 of sector 251A may provide a sector clock 254A and clock distribution element 174 of sector 251B may provide a sector clock 254B. In the example, the sector clocks 254A and 254B may be compared in the phase difference detector 162. The phase difference detector 162 that may be logically or physically disposed in a sector boundary between sectors 251A and 251B. The phase difference detector 162 may be initiate its operation by a phase lock signal 252. During operation, the phase difference detector 162 may compare the two sector clocks 254A and 254B from adjacent sectors. If the phase difference is larger than a tolerance (e.g., 1 ns, 10 ns, or 100 ns), the sector delay element 160 in the sector 251B may be adjusted (e.g., increase in the delay, decrease in the delay) by a control signal 256. The adjustments may be incremental and/or discrete. In this manner, the phase difference detector 162 and the sector delay element 160 may be used to minimize the skew between the sector clocks 254A and 254B. The phase difference detectors (e.g., phase difference detectors 162, and phase difference detectors 204A and 204B in phase detector and delay circuitry 172) may be implemented using an SR latch, a phase-locking loop (PLL), or a digital locking loop (DLL).

Figure 8:
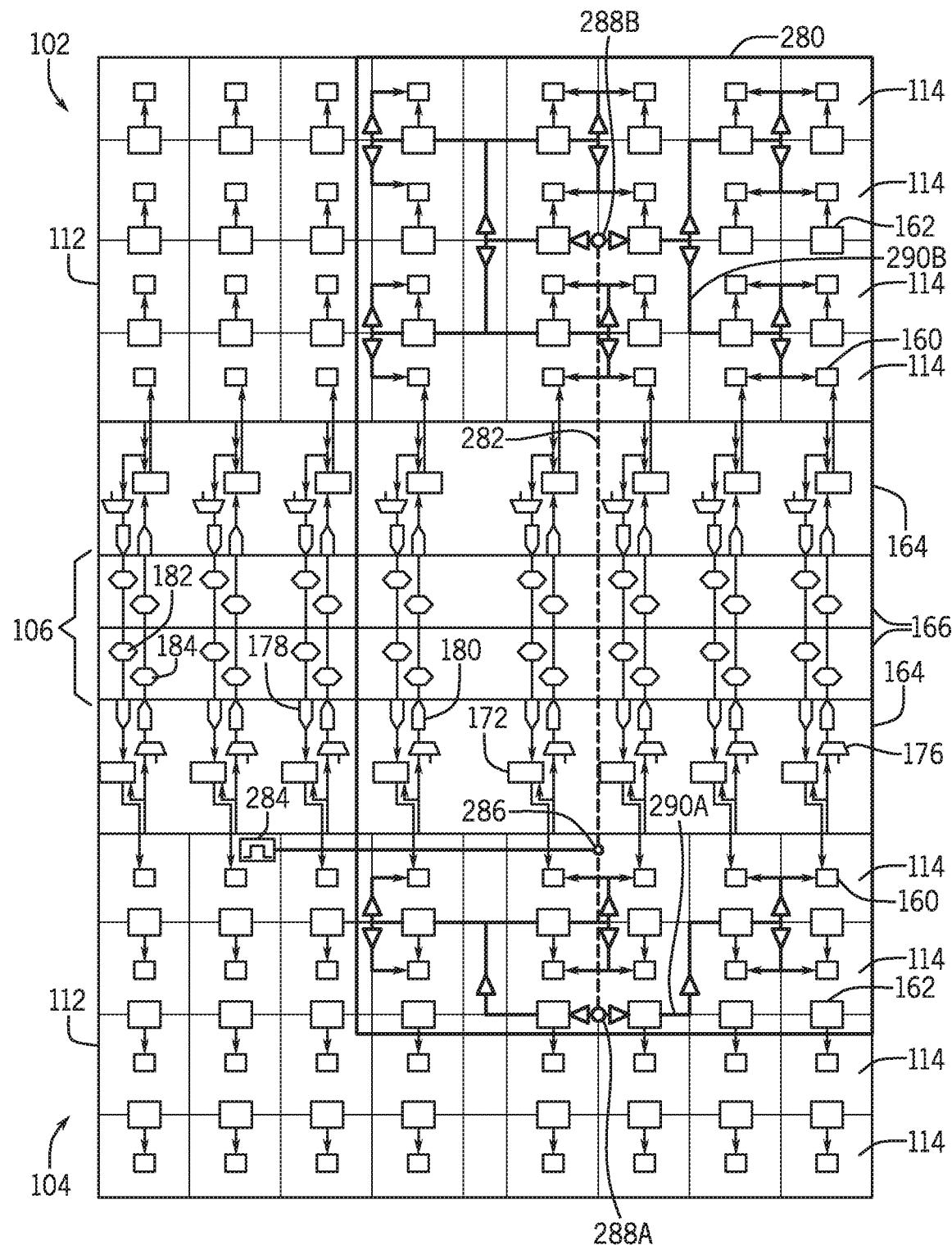
FIG. 8 is a schematic illustration of a circuit design that may be implemented in the programmable logic device with timing circuitry, such as that of FIG. 5, in accordance to an embodiment.

FIG. 8 illustrates the integration of the above-described process in the multi-die programmable logic device 12 having programmable logic dies 102 and 104 coupled via a bridge 106. The illustration of FIG. 8 may be similar to the illustration of FIG. 5 and numbered elements may be the same as described in FIG. 5. In FIG. 8, the programmable logic device 12 may have a circuit design 280 that is employs programmable fabric 112 in programmable logic dies 102 and 104. The circuit design 280 may include a clock tree 282 that may have a clock source 284. Clock tree 282 may include a node 286 in the programmable fabric 112. Node 286 may provide clock signals to the clock tree root nodes 288A and 288B. As illustrated in FIG. 8, clock tree 282 may have a first portion 290B in the programmable logic die 102 that may have a root node 288B and a second portion 290A in the programmable logic die 104 that may have a root node 288A. Each portion 290A and 290B of the clock tree 282 may be balanced (e.g., the distance between the root nodes 288A and 288B and the leaves or terminals may be uniform). Thus, if the clock skew between root nodes 288A and 288B is reduced, the clock skew across the leaves or terminals of the clock tree 282 may be minimized, using the strip circuitry and the methods discussed herein.

Figure 9:
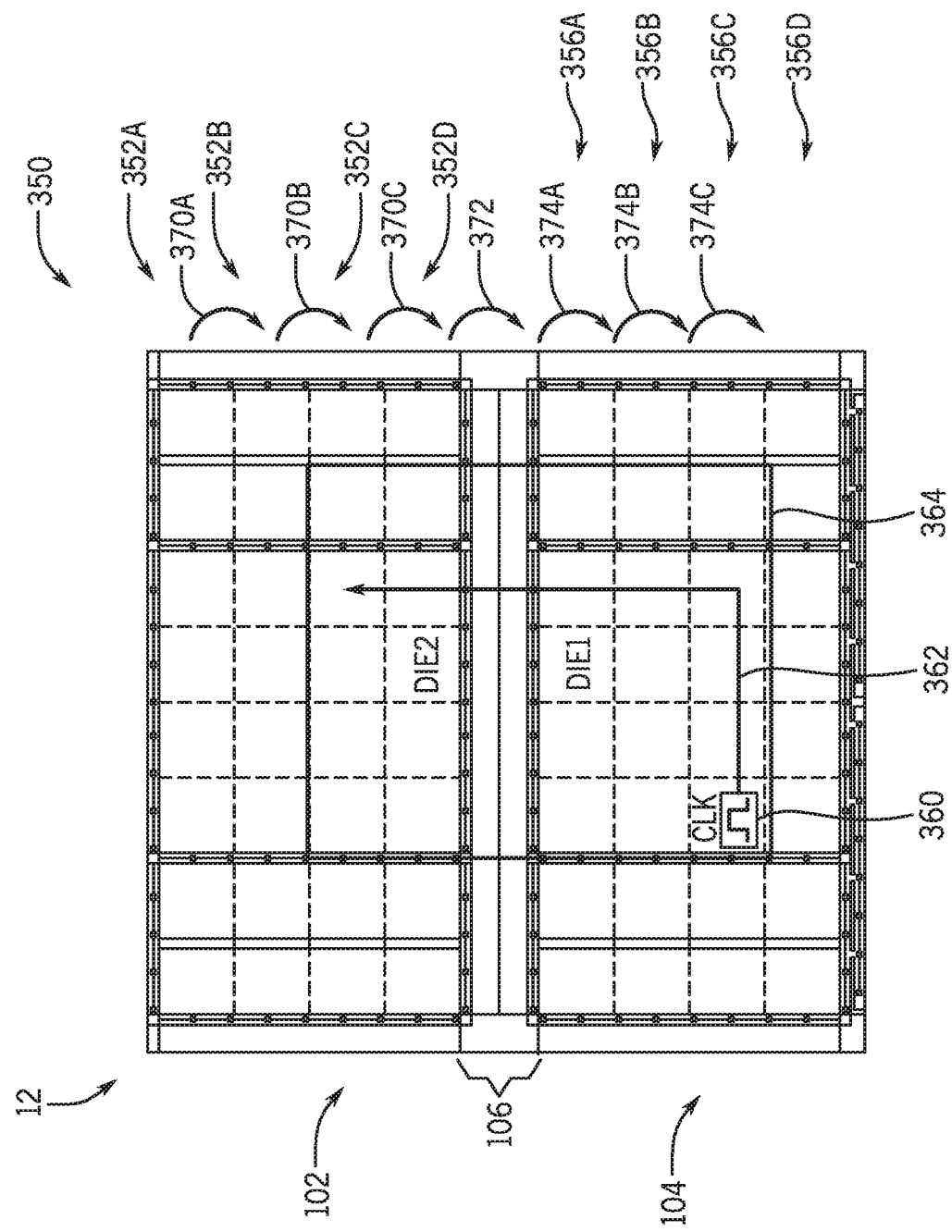
FIG. 9 is a diagram for a method to perform synchronization across a multi-die programmable logic device, in accordance with an embodiment.

The skew minimization across the programmable logic device 12, such as described above, may be performed employing die-to-die minimization illustrated in FIG. 6 and sector-to-sector minimization in FIG. 7. FIG. 9 illustrates an iterative method 350 to perform the synchronization in the multiple sectors 114 and the multiple programmable logic dies 102 and 104. The method 350 may be performed during initiation of operations of the programmable logic design. The region of the programmable logic device 12 and the sequence of the processes may be determined by the area assigned to the circuit design 364. Moreover, Method 350 may facilitate the programming (e.g., synthesis, timing closure) of the circuit design 364 and/or of clock tree 362. In the illustrated system, circuit design 364 may span programmable logic dies 102 and 104 and may receive clock signals from clock source 360 through the clock tree 362.

In the iterative method 350, the sector rows of the programmable logic dies 102 and 104 may be traversed sequentially. For example, the method 350 may include a process 370A in which sectors in a sector row 352B may be synchronized to sector row 352A, a process 370B in which sector row 352C may be synchronized to sector row 352B, and a process 370C in which sector row 352D may be synchronized to sector row 352C, as illustrated in FIG. 9. In the implementation of method illustrated in FIG. 9 the circuit design 364 spans sector rows 352C and 352D of programmable logic die 102, the method 350 may initiate with the process 370C in which sector row 352D may be synchronized to sector row 352C, as illustrated.

Following the synchronization process within programmable logic die 102, method 350 may proceed with the synchronization of programmable logic die 104. To that end, row 356A may be synchronized to sector row 352D using a die-to-die synchronization method (e.g., as illustrated in FIG. 6) in process 372. Once the two programmable logic dies 102 and 104, may be synchronized across the bridge 106, the method 350 may perform synchronization within the programmable logic die 104. To that end, the method 350 may include a process 374A in which sectors in a sector row 356B may be synchronized to sector row 356A, a process 374B in which sector row 356C may be synchronized to sector row 356B, and a process 374C in which sector row 356D may be synchronized to sector row 356C, using a sector-to-sector synchronization method (e.g., as illustrated in FIG. 7).

Figure 10:
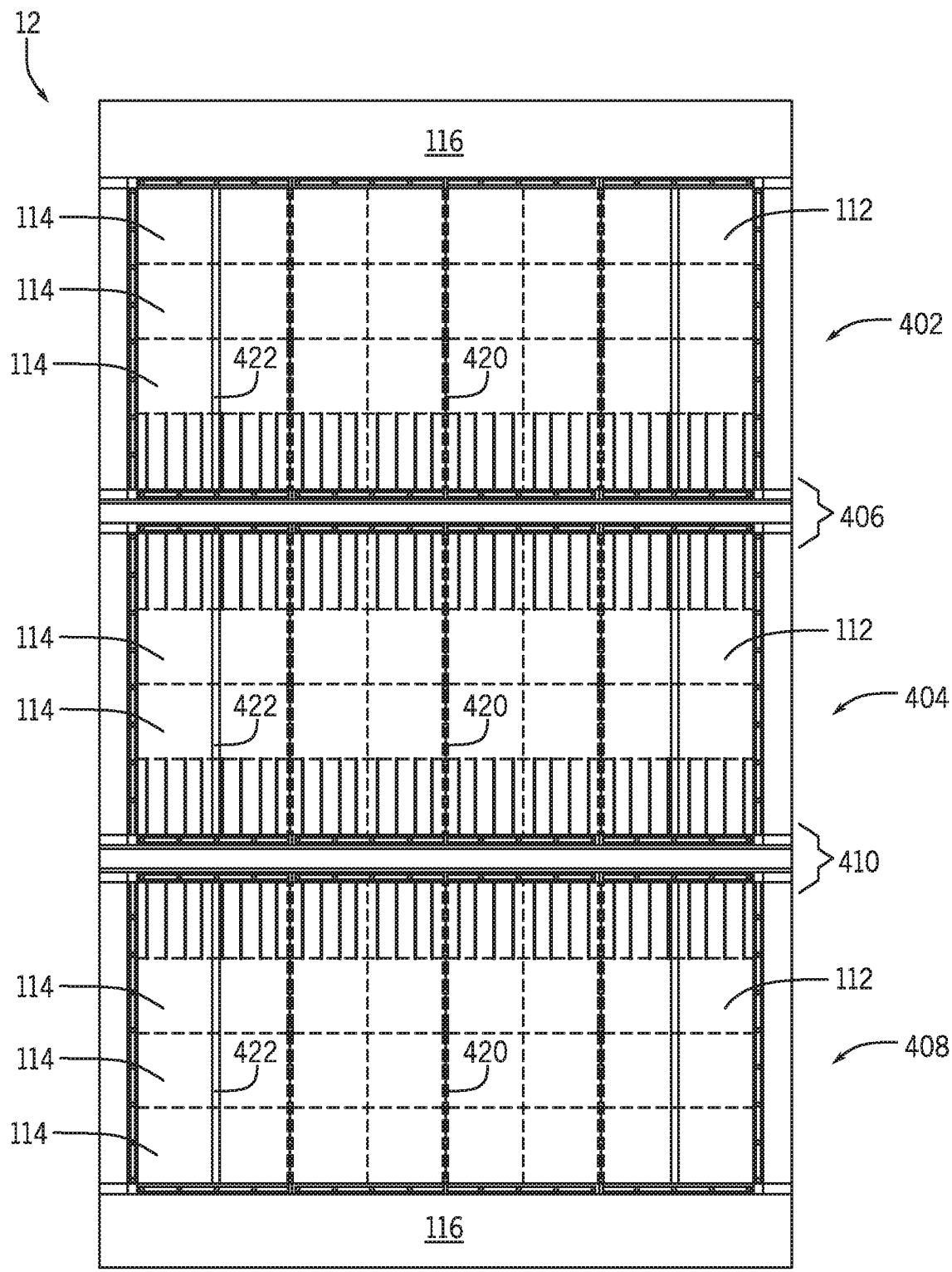
FIG. 10 is a diagram of a multi-die programmable logic device with a glue die, and that may employ timing circuitry to performing synchronization, in accordance with an embodiment.

The methods and systems described herein may be employed with programmable logic devices having more than two dies, such as the programmable logic device 12 illustrated in FIG. 10. Programmable logic device 12 of FIG. 10 may have an edge die 402, a glue die 404, and a second edge die 408. Edge die 402 may be coupled to the glue die 404 through bridge 406 and the edge die 408 may be coupled to the glue die 404 through bridge 410. Bridges 406 and 410 may be, for example, wire bonded interfaces (e.g., a row of contacts or pins) or 2.5D interfaces (e.g., a high-density interconnect bridge). In some embodiments, the coupling in the bridges 406 and 410 may employ microbump interconnects. As detailed below, the interface between the programmable edge dies 402 and 408, glue die 404, and bridges 406 and 410 may include a timing strip (e.g., timing circuitry, timing strip 164) along the edge of the dies.

Edge dies 402 and 408 may include I/O circuitry 116. The I/O circuitry 116 may include, among other things, protocol circuitry, transceivers, amplifiers, clock-and-data recovery circuitry, and eye detectors. The I/O circuitry 116 may be configured to access a memory device (e.g., a high bandwidth memory (HBM), dynamic random-access memory (RAM) device), or to connect to other electronic devices using a communications protocol, such as an Ethernet protocol, a peripheral component interconnect express (PCIe) protocol, or a universal serial bus (USB) protocol. The edge dies 402 and 408 and the glue die 404 may include programmable fabric 112, which may be arranged in sector 114, as discussed above. The programmable fabric 112 on the dies may also include a NoC 420 and/or hardened interconnect lines 422 that may provide low latency access between sectors 114 and the I/O circuitry 116 or the bridges 406 and 410.

Figure 11:
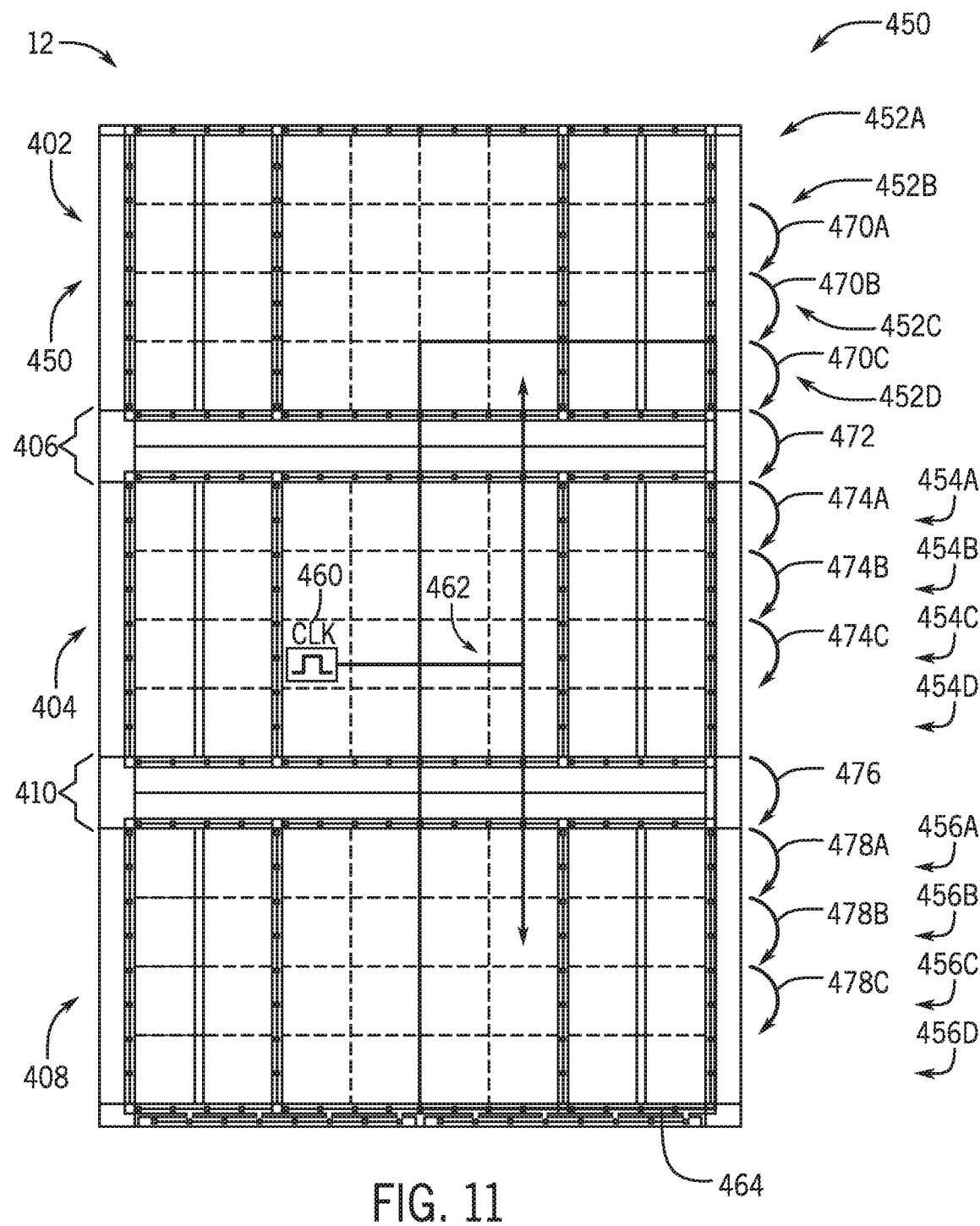
FIG. 11 is a diagram for a method to perform synchronization across a multi-die programmable logic device with a glue die, in accordance with an embodiment.
Figure 12:
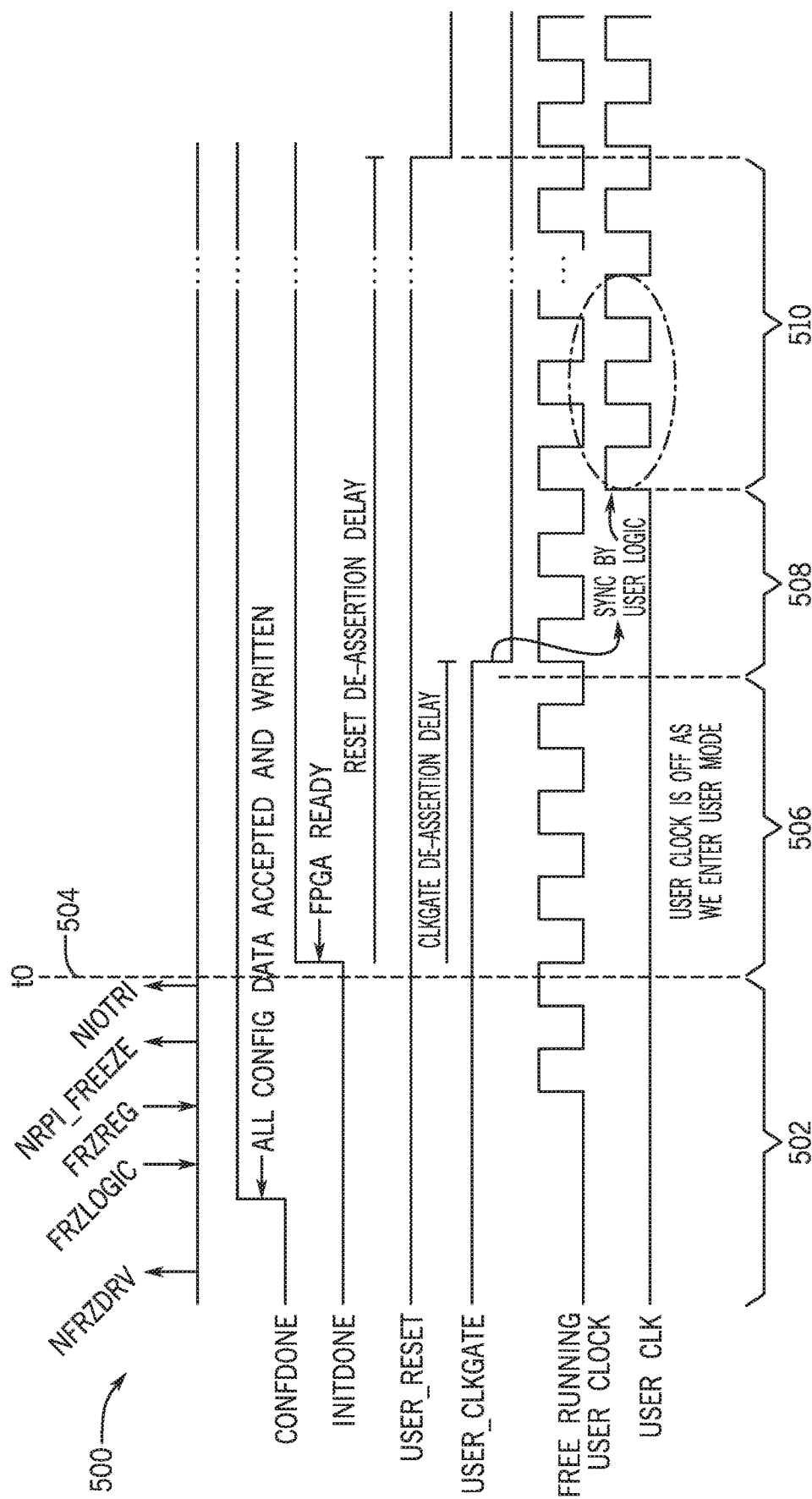
FIG. 12 is a timing chart for the performance of synchronization during the initiation of a programmable logic device, in accordance with an embodiment.

FIG. 11 illustrates an iterative method 450 to perform synchronization across the multi-die programmable logic device 12 to minimize clock skew across a circuit design. The method 450 may perform the synchronization in the multiple sectors 114 and in the multiple programmable dies (e.g., edge dies 402 and 408 and glue die 404) of the programmable logic device. The method 450 may be performed during initiation of operations of the programmable logic design. The region and the specific sequence of processes in method 450 may be parameterized by a circuit design 464 implemented in the programmable logic device 12. In the illustrated system, the circuit design 464 may have a clock tree 462 that may span programmable fabrics 112 in edge die 402, glue die 404, and edge die 408. The registers assigned to circuit design 464 may receive clock signals from clock source 460 via the clock tree 462. Method 450 may minimize the clock skew between the registers clocked by the clock tree 462.

In the iterative method 450, the sector rows of the programmable logic dies 402, 404, and 408 may be traversed sequentially. For example, the method 450 may include a process 470A in which sectors in a sector row 452B may be synchronized to sector row 452A, a process 470B in which sector row 452C may be synchronized to sector row 452B, and a process 470C in which sector row 452D may be synchronized to sector row 452C. Sector-to-sector synchronization may employ a method such as the one illustrated in FIG. 7. In the implementation of method 450 illustrated in FIG. 11, the circuit design 464 include the sector row 452D in edge die 402, and the method 450 may skip sector-to-sector synchronization with the edge die 402 and initiate with the synchronization of glue die 404. To that end, sector row 454A may be synchronized to sector row 452D using a die-to-die synchronization method (e.g., as illustrated in FIG. 6) in a process 472.

Once the edge die 402 and the glue die 404 are synchronized across bridge 406, the method 450 may perform synchronization within the glue die 404. To that end, the method 450 may include a process 474A in which sectors in a sector row 454B may be synchronized to sector row 454A, a process 474B in which sector row 454C may be synchronized to sector row 454B, and a process 474C in which sector row 454D may be synchronized to sector row 454C, using a sector-to-sector synchronization (e.g., as illustrated in FIG. 7).

Following the synchronization in glue die 404, the method 450 may initiate with the synchronization the edge die 408. To that end, sector row 456A may be synchronized to sector row 454D using a die-to-die synchronization method (e.g., as illustrated in FIG. 6) in a process 476. The method 450 may, then, perform synchronization within the edge die 408. To that end, the method 450 may include a process 478A in which sectors in a sector row 456B may be synchronized to sector row 456A, a process 478B in which sector row 456C may be synchronized to sector row 456B, and a process 478C in which sector row 456D may be synchronized to sector row 456C, using a sector-to-sector synchronization (e.g., as illustrated in FIG. 7). As discussed above, the skew minimization achieved with the process may be specific to the portions (e.g., rows, sectors, dies) of the programmable logic device 12 that are assigned to a circuit design. In situations in which two or more circuit designs are implemented in a programmable logic device 12, each circuit design may implement the process independently. In some embodiments, the different circuit designs may have clocks with different phases and/or different frequencies.

While the synchronization methods 350 and 450 of FIGS. 9 and 11 described above illustrates a top-to-bottom sequential process, it should be understood that not every die or sector row will necessarily initiate the compensation process and, moreover, that the synchronization methods may be initiated from any die or any sector of the programmable logic device. The compensation may, generally, initiate from a die-to-die compensation between a first die and a second die, followed by a subsequent sector-to-sector compensation in the second die. Subsequent die-to-die skew compensation and sector-to-sector compensation may take place to synchronized 3 or more dies.

As discussed above, the performance of the synchronization (e.g., methods 350 of FIG. 9 and 450 of FIG. 11) may be performed during an initialization of operations of the programmable logic device. Chart 500 illustrates an example of when the synchronization may take place. In chart 500, period 502 may be a period during initiation is taking place. During period 502, verification of the bitstream (e.g., bitstream 18, circuit design) and configuration of the programmable fabric may take place. At time 504, the programmable logic device 12 may be ready to initiate its activity. During period 506, the programmable logic device 12 may prepare to enter user mode. At this stage, the clock sources (e.g., phase-lock loops (PLLs), digital lock loops (DLLs), etc.) may stabilize, with a gated user clock. Following period 506, the programmable logic device 12 may initiate the clock synchronization process, as discussed above. During this stage, the clock tree may be operational but gated, to allow initiation of the synchronization process to proceed without impacting the operations of the configured circuit design. In the following period 510, the programmable logic device 12 may beginning adjusting the delay elements, as discussed above, to obtain phase alignment. Phase alignment may be reached at the end of period 510. After period 510, the programmable logic device may initiate its operation, by activating (e.g., un-gating) the clock tree and allowing the toggling of the registers of the circuit design.

Figure 13:
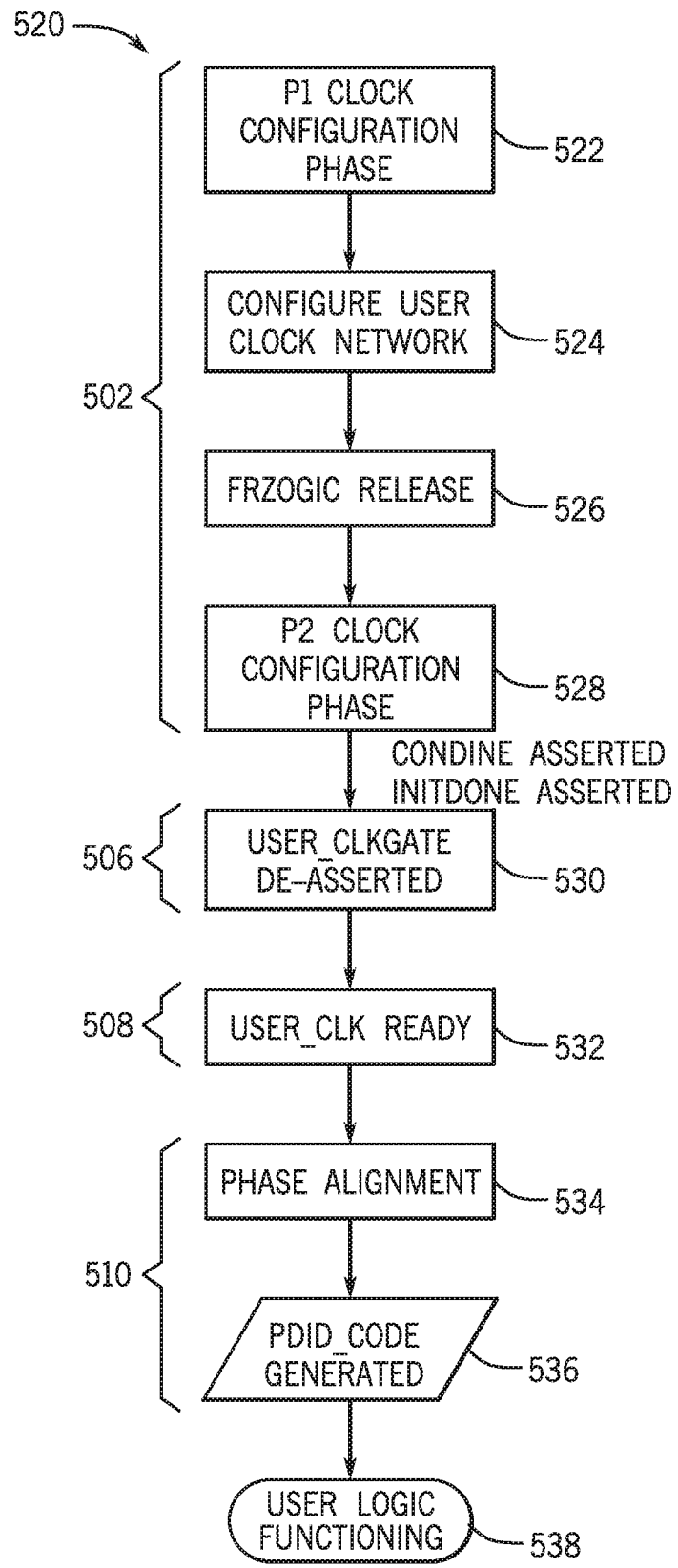
FIG. 13 is a flow chart for a method to perform synchronization during the initiation of a programmable logic device, in accordance with an embodiment.

The method 520 in FIG. 13 further illustrates the processes associated with clock distribution configuration during initiation of the programmable logic device. During period 502, the primary clock P1 may be configured in process 522. In process 524, the routing in the clock distribution network may be configured, to generate the clock trees. In process 526, the FRZLOGIC signal may be released and the local clocks P2 may be configured in process 528. At the end of period 502, the configuration done (CONDONE) and the initialization done (INITDONE) signals may be asserted. In process 530, the user clock gate may be de-asserted. Accordingly, the freeze signals de-assertion may be controlled to prevent toggling of the circuit design during the initiation of the user clock and the initiation and synchronization process. In process 532, the user clock network may be initialized and stabilized. In period 510, the synchronization process may take place. In process 534, the phase alignment may be performed through, for example, the sector-to-sector and the die-to-die methods described above. At the end of the process, a code 536 may be generated to allow initialization of operation of the user logic, in stage 538.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]in [a function] . . . " or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A programmable logic device comprising:
  a first die comprising programmable fabric that comprises:
    a plurality of sectors comprising a first sector that comprises a first sector delay element and a second sector that comprises a second sector delay element; and
    a sector boundary phase difference configurable to receive a first clock from the first sector delay element, a second clock from the second sector delay element, and to control the first sector delay element based on a difference between the first clock and the second clock;
  a second die comprising programmable fabric; and
  a bridge circuitry directly coupled to the first die and the second die, and wherein the first die comprises first timing circuitry coupled to the bridge circuitry and comprising a phase difference detector and a delay element controlled by the phase difference detector.

2. The programmable logic device of claim 1, wherein the second die comprises second timing circuitry coupled to the bridge circuitry and comprising a second phase difference detector and a second delay element.

3. The programmable logic device of claim 1, wherein the phase difference detector comprises an SR latch.

4. The programmable logic device of claim 1, wherein at least one of the first sector delay element or the second sector delay element is controlled by the phase difference detector of the first timing circuitry.

5. The programmable logic device of claim 1, wherein the bridge circuitry comprises a microbump interconnect.

6. The programmable logic device of claim 1, wherein the first die comprises input/output circuitry.

7. The programmable logic device of claim 1, comprising a third die comprising programmable logic and a second bridge directly coupled to the second die and the third die.

8. An electronic device, comprising:
a field programmable gate array device (FPGA) comprising:
   a first programmable logic die comprising a timing strip, wherein the timing strip comprises a plurality of phase difference detectors and delay elements;
   a bridge coupled to the timing strip of the first programmable logic die; and
   a second programmable logic die coupled to the first programmable logic die through the bridge.

9. The electronic device of claim 8, wherein the timing strip is configurable to minimize a timing skew in a clock tree that spans the first programmable logic die and the second programmable logic die.

10. The electronic device of claim 9, wherein minimizing the timing skew in the clock tree comprises:
   receiving, in a first phase difference detector of the timing strip a reference clock from a first portion of the clock tree disposed in the first programmable logic die;
   receiving in the first phase difference detector of the timing strip a feedback clock from a second portion of the clock tree disposed in the second programmable logic die;
   determining a phase difference between the reference clock and the feedback clock; and
   adjusting a first delay element of the plurality of the timing strip.

11. The electronic device of claim 10, wherein minimizing the timing skew comprises adjusting a sector delay element of a sector adjacent to the timing strip of the first programmable logic die.

12. The electronic device of claim 8, wherein the FPGA comprises:
   an array of sectors, wherein each sector comprises a clock distribution element that comprises a sector delay element; and
   a plurality of boundary phase difference detection circuitry configurable to receive at least two clocks from clock distribution elements of adjacent sectors and to control at least one sector delay element of adjacent sectors.

13. The electronic device of claim 8, wherein the FPGA comprises an accelerator for machine learning, video processing, voice recognition, or image recognition.

14. The electronic device of claim 8, wherein the first programmable logic die comprises input/output circuitry, and wherein the electronic device of claim 10 comprises a processor, a memory, or a network interface, or any combination thereof, configurable to communicate with the FPGA through the input/output circuitry.

15. A method to minimize skew in a programmable logic device, comprising:
   configuring a plurality of sectors of the programmable logic device with a first bitstream comprising a first circuit design, wherein plurality of sectors comprises:
      a first portion of sectors disposed in a first die and arranged in a first set of sector rows; and
      a second portion of sectors disposed in a second die and arranged in a second set of sector rows;
   performing sector-to-sector synchronization between a first row of the first set of sector rows and a second row of the first set of sector rows;
   performing die-to-die synchronization between the second row of the first set of sector rows and a first row of the second set of sector rows; and
   performing sector-to-sector synchronization between the first row of the second set of sector rows and a second row of the second set of sector rows.

16. The method of claim 15, wherein the second row of the first set of sector rows and the first row of the second set of sector rows are adjacent to a bridge that couples the first die to the second die.

17. The method of claim 15, wherein the sector-to-sector synchronization comprises:
   receiving, in a first phase difference detector associated with a first boundary between a first sector and a second sector of the plurality of sectors, a first clock from the first sector and a second clock from the second sector;
   determining a phase difference between the first clock and the second clock; and
   adjusting a sector delay element in the first sector based on the phase difference.

18. The method of claim 15, wherein the die-to-die synchronization comprises:
   receiving, in a first phase difference detector of a timing strip of the first die that interfaces a bridge that couples the first die to the second die, a reference clock from a first sector of the first die adjacent to the bridge and a feedback clock from a second sector of the second die adjacent the bridge;
   determining a phase difference between the reference clock and the feedback clock; and
   adjusting a delay element in the timing strip of the first die.

19. The method of claim 15, wherein the die-to-die synchronization comprises adjusting a sector delay element of a first sector of the first portion of sectors.

20. The method of claim 15, wherein the plurality of sectors comprises a third portion of sectors disposed in the second die and arranged in a third set of sector rows, and the method comprises:
   performing die-to-die synchronization between the second row of the second set of sector rows and a first row of the third set of sector rows, wherein the second row of the second set of sector rows and the first row of the third set of sector rows are adjacent to a second bridge that couples the second die to a third die.

21. The programmable logic device of claim 1, wherein the first timing circuitry is disposed along a first edge of the first die adjacent to the bridge circuitry.

22. The programmable logic device of claim 2, wherein the second timing circuitry is disposed along a first edge of the second die adjacent to the bridge circuitry.

* * * * *